(12) United States Patent
Panzarella

(10) Patent No.: US 8,159,958 B1
(45) Date of Patent: Apr. 17, 2012

(54) KRONE BLOCK DONGLE

(75) Inventor: Rosario Martino Panzarella, Middlesex County, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1017 days.

(21) Appl. No.: 10/818,570

(22) Filed: Apr. 6, 2004

(51) Int. Cl.
*H04L 12/66* (2006.01)

(52) U.S. Cl. ......... 370/249; 370/352; 370/359; 370/401

(58) Field of Classification Search .................... 370/249
See application file for complete search history.

(56) References Cited

U.S. PATENT DOCUMENTS

| | | | |
|---|---|---|---|
| 4,688,865 A | 8/1987 | Kelly | |
| 5,290,191 A * | 3/1994 | Foreman et al. | 439/225 |
| 5,546,267 A | 8/1996 | Frederiksen et al. | |
| 6,091,803 A * | 7/2000 | Thompson | 379/37 |
| 6,636,593 B1 * | 10/2003 | MeLampy et al. | 379/114.15 |
| 6,834,135 B2 * | 12/2004 | Yasue et al. | 385/16 |
| 7,046,680 B1 * | 5/2006 | McDysan et al. | 370/396 |
| 7,292,590 B1 * | 11/2007 | Chen et al. | 370/401 |
| 2002/0067803 A1 * | 6/2002 | Antonucci et al. | 379/45 |
| 2002/0101852 A1 * | 8/2002 | Say | 370/352 |
| 2005/0141567 A1 * | 6/2005 | Jaber et al. | 370/537 |
| 2005/0147051 A1 * | 7/2005 | Suri | 370/249 |
| 2005/0154288 A1 * | 7/2005 | Wang et al. | 600/407 |
| 2006/0285546 A1 * | 12/2006 | Carew et al. | 370/401 |

* cited by examiner

*Primary Examiner* — Chirag Shah
*Assistant Examiner* — Jay P Patel

(57) ABSTRACT

The present invention relates generally to Krone block dongle. More particularly, the invention encompasses a method and an apparatus to monitor any media DSLAM port remotely off of a Krone block assignment.

13 Claims, 2 Drawing Sheets

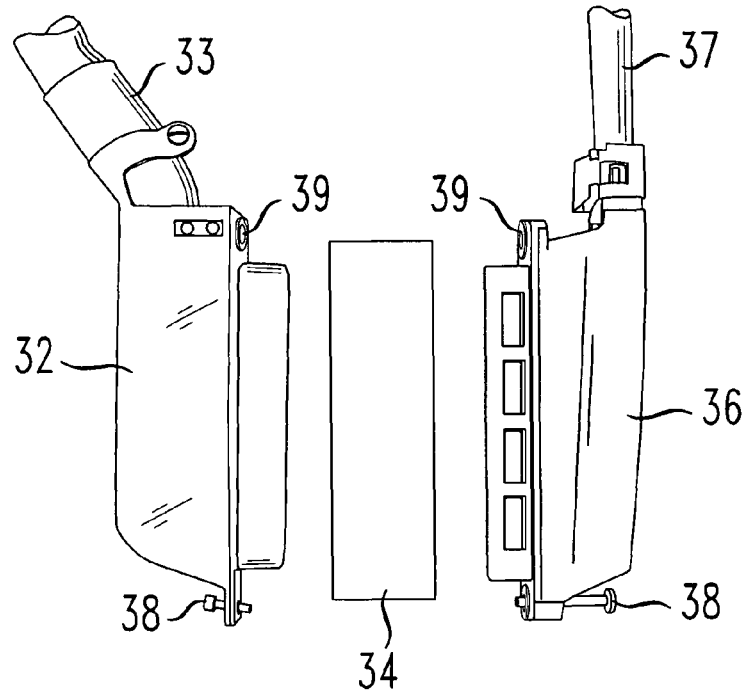
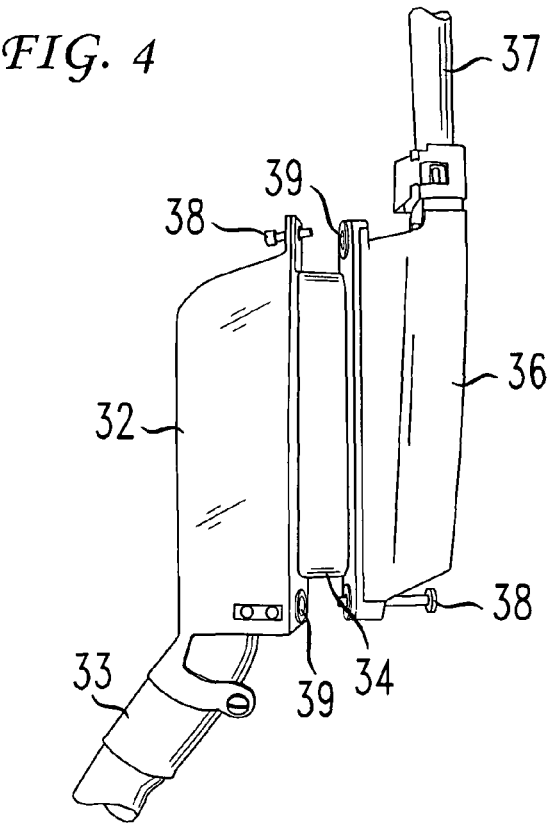

KRONE BLOCK DONGLE

FIELD OF THE INVENTION

The present invention relates generally to Krone block dongle. More particularly, the invention encompasses a method and an apparatus to monitor any media DSLAM port remotely off of a Krone block assignment.

BACKGROUND INFORMATION

The telecommunication industry uses different types of communication equipment and networks. Each of the equipment enhances the communication process. For example, a call from a communications device could be routed through a series of switches, routers, networks, to name a few, prior to the call reaching its final destination. In each interaction with the equipment the call might get degraded if it is not in sync with the equipment. This problem could degrade the call to a point of not even reaching its final destination. Similarly, the call could be of such poor quality that the call is not able to achieve its original objective.

Also as deregulation of the telephone industry continues and as companies prepare to enter the local telephone access market, there is a need to offer new and innovative, high bandwidth services that distinguish common carriers from their competitors. This cannot be accomplished without introducing new local access network architectures that will be able to support these new and innovative services.

Conventionally, customer premises telephone and/or data connections contain splitters for separating analog voice calls from other data services such as Ethernet transported over digital subscriber line (DSL) modems. Voice band data and voice signals are sent through a communications switch in a central or local office to an interexchange carrier or Internet service provider (ISP). DSL data is sent through a digital subscriber loop asynchronous mode (DSLAM) switch which may include a router. The DSLAM switch connects many lines and routes the digital data to a telephone company's digital switch.

A major problem with this configuration is that interexchange carriers attempting to penetrate the local telephone company's territory must lease trunk lines from the local telephone company switch to the interexchange carrier company's network for digital traffic. Furthermore, the Internet service provider (ISP) must lease a modem from the local phone company in the DSLAM switch and route its data through the local phone company's digital switch. Thus, the local phone company leases and/or provides a significant amount of equipment, driving up the cost of entry for any other company trying to provide local telephone services and making it difficult for the interexchange companies to differentiate their services. Furthermore, since DSL modem technology is not standardized, in order to ensure compatibility, the DSL modem provided by the local telephone company must also be provided to the end user in the customer premises equipment (CPE). Additionally, since the network is not completely controlled by the interexchange companies, it is difficult for the interexchange companies to provide data at committed delivery rates. Any performance improvements implemented by the interexchange companies may not be realized by their customers, because the capabilities of the local telephone company equipment may or may not meet their performance needs. Thus, it is difficult for the interexchange companies to convince potential customers to switch to their equipment or to use their services. These factors ensure the continued market presence of the local telephone company.

It is also generally known in the art of telecommunication equipment a certain connector block with dual terminals for multiple wire conductor pairs, referred to sometimes as a "Krone-style connector block" or "Krone block." Krone block provides for rapid wiring installation of key telephone systems, such as, PBX systems, cables, and other terminal equipment, to name a few. Typically, these Krone blocks are formed as a part of a modular plug connector which is fixed to a back mount frame secured to distribution frame members for distributing or cross-connecting incoming telecommunication lines.

It is also generally known that telephone communication equipment operates on relatively low voltages and is sometimes exposed to transient voltages of considerably higher levels than the normal operating voltages. For instance, this may be caused by a lightning strike, by short circuiting with a high voltage line, or by other circumstances. Therefore, the Krone blocks are designed to receive protector units with overvoltage and overcurrent protection devices so as to protect the expensive internal telecommunication equipment connected to the output side of a terminal circuit. Thus, the Krone block includes a first or unprotected side for receiving connections to outside/incoming lines and a second or protected side for receiving connections to internal lines coupled to the telecommunication equipment to be protected, and terminal means so that the protector units can be plugged therein to provide the protection against overvoltage and/or over current conditions.

However, this invention overcomes the problems of the prior art. The invention includes a Krone block dongle to enhance a communication network. More particularly, the invention encompasses a method and an apparatus for routing a call through at least one Krone block dongle within a communication network.

PURPOSES AND SUMMARY OF THE INVENTION

The invention is a novel method and an apparatus for providing at least one Krone block dongle in a communication network.

Therefore, one purpose of this invention is to provide at least one Krone block dongle within a communication network.

Another purpose of this invention is to use the Krone block dongle to get at least one ping.

Yet another purpose of the present invention to provide an apparatus and method for testing and monitoring the telecommunication service over POTS lines.

Still yet another purpose of the present invention is to provide a two-way test and monitoring of telecommunication installations, that tests the quality of service, including wiring and apparatus along the telecommunication path.

Therefore, in one aspect this invention comprises a method for monitoring a communication network, comprising the steps of (a) sending at least one "ping" from at least one switch to at least one dongle device, (b) receiving said at least one "ping" at said dongle device, and processing said "ping" at said dongle device, (c) sending a feedback to said at least one switch from said at least one dongle device in response to said "ping", and (d) evaluating said feedback at said at least one switch.

In another aspect this invention comprises a method for monitoring a communication network, comprising the steps of:
(a) receiving at least one "ping" message sent by at least one switch,
(b) processing said at least one "ping" message at least one dongle device,
(c) sending a feedback message to said at least one switch from said at least one dongle device in response to said "ping" message, and
(d) evaluating said feedback at said at least one switch.

In still another aspect this invention comprises a program storage device readable by machine, tangibly embodying a program of instructions executable by the machine to perform method steps for monitoring a communication network, the method steps comprising:
(a) sending at least one "ping" from at least one switch to at least one dongle device,
(b) receiving said at least one "ping" at said dongle device, and processing said "ping" at said dongle device,
(c) sending a feedback to said at least one switch from said at least one dongle device in response to said "ping", and
(d) evaluating said feedback at said at least one switch.

In still yet another aspect this invention comprises a communication apparatus comprising at least one dongle device secured between a male and a female electronic component, and wherein said dongle device has at least one means to monitor communication within at least one network.

In still another aspect this invention comprises a communication apparatus comprising at least one dongle device adapted to connect to a Krone block and having at least one means to verify sync from at least one router in a communication network.

BRIEF DESCRIPTION OF THE DRAWINGS

The features of the invention believed to be novel and the elements characteristic of the invention are set forth with particularity in the appended claims. The drawings are for illustration purposes only and are not drawn to scale. Furthermore, like numbers represent like features in the drawings. The invention itself, both as to organization and method of operation, may best be understood by reference to the detailed description which follows taken in conjunction with the accompanying drawings in which:

FIG. 3 illustrates the inventive dongle device between a male and female connector at a Krone block or bay.

FIG. 4 illustrates the inventive dongle device after it has been mated with a male and female connector at a Krone block or bay.

DETAILED DESCRIPTION

Figure 1:
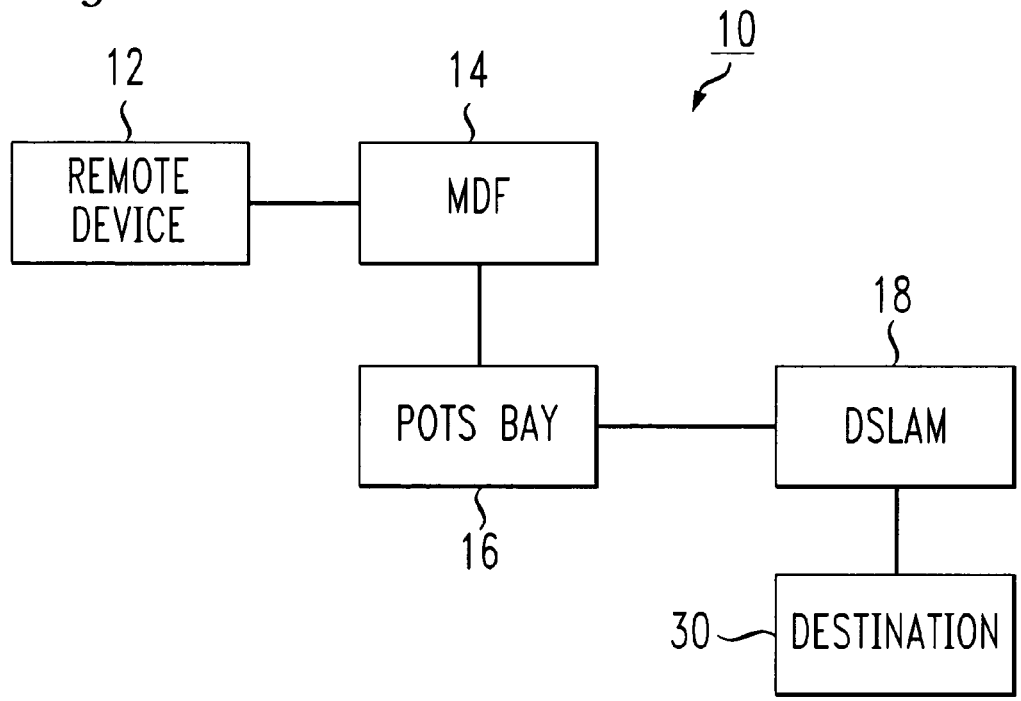
FIG. 1 is an exemplary portion of a communication network which is used to illustrate the present invention.

FIG. 1 is an exemplary portion of a communication network 10 which is used to illustrate the present invention. In a typical communication network a calling party wants to reach or send data or information to a called party. The communication network seamlessly routes the call from the calling party to the destination and establishes the communication link. For example, as illustrated in FIG. 1, the communication network 10, could route the call from the calling party via a remote device 12 to a POTS (Plain Old Telephone Service) bay 16 via a Main Distribution Frame (MDF) 14. The POTS bay 16 processes the call and forwards it to a destination 30 via a digital subscriber loop asynchronous mode (DSLAM) switch 18. For the ease of understanding numerous other components between the remote device 12 and the destination 30 have not been shown. However, it should be appreciated that components between the calling party and the called party may be owned and operated by a number of different companies or entities.

Figure 2:
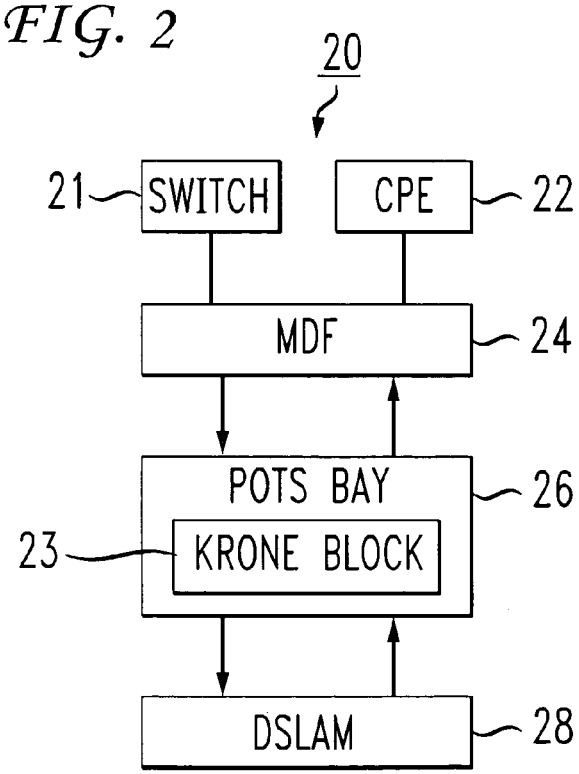
FIG. 2 illustrates a detailed view of an embodiment of a communication network of the present invention.

FIG. 2 illustrates a detailed view of an embodiment of a communication network 20 of the present invention. In this embodiment a switch 21 and customer premises equipment (CPE) 22 are is communication with at least one MDF 24. A DSLAM 28 communicates with the MDF 24 via a POTS bay 26. A Krone block or bay 23 is preferably associated with the POTS bay 26, and has at least one means to monitor the communication between the MDF 24 and DSLAM 28. It is preferred that the inventive dongle device 34, as more clearly shown in FIGS. 3 and 4, be placed at an appropriate location between the remote device 12 and the destination 30. For the purposes of illustration it is preferred that the dongle device 34 be placed in the Krone block 23 within the POTS bay 26, however, as stated earlier that the inventive dongle device 34 could be placed at any appropriate location within the communication network 20 or within any apparatus used in the communication network 20. Furthermore, other consideration could dictate the placement of the DSLAM switch 28 and the MDF 24 at other appropriate locations within the communication network 20. The communication network 20 would also have the switch 21 which would communicate with the dongle device 34. It is preferred that the dongle device 34 is operated and maintained by the operating entity, however, the dongle device 34 could be located within the customer premises equipment (CPE) 22.

In a preferred operation the switch 21 would send a "ping" to the dongle device 34 and if all the communication is in sync then the "ping" would be processed by the dongle device 34 and sent back to the switch 21 providing the switch 21 the needed information. However, if any equipment at any location is not in sync then the switch 21 which is preferably at a location different from the dongle device 34 would observe the problem and appropriate action would be called for by the switch 21. For example, one action would be to set off an alarm, another action could be to display the problem, yet another action could be send a second "ping" to verify the problem before any action is taken, to name a few.

FIG. 3 illustrates the inventive dongle device 34, which for the purposes of illustration has been placed between a male electronic component or connector 32 and a female electronic component or connector 36 at the Krone block or bay 23. It is preferred that the dongle device 34 sits in between the male connector 32 and the female connector 36 at the Krone block or bay 23, however, it can be easily envisioned that the inventive dongle device 34 could be placed in the communication network at another equally appropriate location. The inventive dongle device 34 is an intelligent device. Power to the inventive dongle device 34 could be provided from the feed that is used for the low voltage circuitry for the ILEC DT (Incumbent Local Exchange Carrier Dial Tone) battery or the local battery feed from the switch or it could also be provided by the local phone company by methods well known in the art. Communications can be processed though a reserved subnet to the dongle device 34, for example, in sets of 25 from the router so as to provide internal network addressing to ping to in network. The male connection 32, having a line 33, can be secured to the female connector 36, having a line 37, via a plurality of securing means 38 and 39.

FIG. 4 illustrates the inventive dongle device 34 after it has been securely mated with the male connector 32 and the female connector 36 at the Krone bay or block 23. It is preferred that the securing means 38, is a bolt 38, and the securing means 39 is a nut 39, however, other securing means, such as, for example, clamps, screws, clips, to name a few, could also be used to secure the connectors 32 and 36 to each other.

This invention has been described with reference to the Krone block or bay switch, however, this invention can also be used with any communication network with switches capable of establishing circuits—for example, Frame Relay switches, ATM switches, IP/MPLS routers, Optical switches, digital and optical cross-connects, to name a few.

The invention has been described as a retro-fit of a Krone block or bay but it could also be a standalone device. However, it is preferable to retrofit the Krone blocks with a data interface device to the aggregate router or similar test point. It should be appreciated that the aggregate router is just a remote point in the network where remote testing can be accessed. A test point launched from anywhere in the network via IP could communicate with the smart device to see if it is online and passing data though its port. The use of the aggregate router as a test point is for the purposes of illustration only and not necessarily defined as a permanent interface point.

Another purpose of the dongle device 34 is to establish clear data communication from the aggregate router to the line side of the Krone block 23. Another advantage of this invention is to be able to verify the sync though the various equipment in a communication network so as to prove that the network though the block at the first point of handoff to the LEC (Local Exchange) is in sync without having to rely on the LEC to tell the provider whether or not they are sending sync through the equipment to the LEC. This inventive dongle device 34 gives the provider a proverbial "ping point" or some similar means of interface from the aggregate router or some point beyond the OC3 to the Krone block.

This invention also solves the problem of not being able to monitor an anymedia DSLAM port remotely off of a Krone block assignment.

The inventive dongle device 34 is a smart device, that is, when it is connected it can provide virtual monitoring of any DSLAM port via remote access in relation to real life outbound Krone connections. This inventive "smart device" can be easily integrated with the existing equipment, that is, it can be retrofitted in the field at an appropriate location, and thus can save the communication provider lots of money in unnecessary dispatches of equipment and personal to locations, which may or may not be owned and/or operated by the communication provider.

The inventive dongle device 34 also eliminates the need to do a test void because of lack of human presence. The inventive dongle device 34 would be of great interest to any CLECs (Competitive Local Exchange Carriers), as they are typically also the communication providers.

It should be appreciated that with the deregulation of the telecommunication industry that there are many vendors and equipment providers to this industry. Similarly, there are many service providers within this industry that provide service when a communication link is established between a calling party and a called party, and it is done so seamlessly that even the calling party and the called party are not aware of the presence of the various providers. For example, the MDF could be owned and/or operated by a first entity, while the DSLAM could be owned and/or operated by a second entity, and the POTS bay could be owned and/or operated jointly or by a third entity. Thus, the presence of the inventive dongle device could be used very effectively within a communication network to verify sync, even though various components are being owned and/or operated by different entities within a communication network.

While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A method for monitoring communication between two different communication networks operated by two different network service providers, comprising:

sending a ping message from a switch to a dongle device located in a device that represents a boundary between the two different communication networks operated by the two different network service providers, wherein the two different network service providers comprise a local exchange carrier and a competitive local exchange carrier and the boundary represents where a call between a calling party and the called party is handed off between the local exchange carrier and the competitive local exchange carrier, receiving the ping message at the dongle device, and processing the ping message at the dongle device, sending a feedback to the switch from the dongle device in response to the ping message, and evaluating the feedback at the switch to determine whether communications between a first component operated by a first one of the two different network service providers and a second component operated by a second one of the two different network service providers are in sync using the ping message.

2. The method of claim 1, wherein the switch is an optical switch.

3. The method of claim 1, wherein the dongle device is securely located in a Krone bay.

4. The method of claim 1, wherein the dongle device is secured between a male and a female electronic component.

5. The method of claim 4, wherein the male and female electronic components are secured to each other by securing means selected from a group comprising of a nut, bolt, screw, clamp and pin.

6. A method for monitoring communication between two different communication networks operated by two different network service providers, comprising:

receiving a ping message sent by a switch, processing the ping message at a dongle device located in a device that represents a boundary between the two different communication networks operated by the two different network service providers in the communications network, wherein the two different network service providers comprise a local exchange carrier and a competitive local exchange carrier and the boundary represents where a call between a calling party and the called party is handed off between a handoff of the local exchange carrier and the competitive local exchange carrier, sending a feedback message to the switch from the dongle device in response to the ping message, and evaluating the feedback at the switch to determine whether communications between a first component operated by a first one of the two different network service providers and a second component operated by a second one of the two different network service providers are in sync using the ping message.

7. The method of claim 6, wherein the switch is an optical switch.

8. The method of claim 6, wherein the dongle device is securely located in a Krone bay.

9. The method of claim 6, wherein the dongle device is secured between a male and a female electronic component.

10. The method of claim 9, wherein the male and female electronic components are secured to each other by a securing means.

11. A program storage device readable by machine, tangibly embodying a program of instructions executable by the machine to perform a method for monitoring communication between two different communication networks operated by two different network service providers, the method comprising:

sending a ping message from a switch to a dongle device located in a device that represents a boundary between the two different communication networks operated by the two different network service providers, wherein the two different network service providers comprise a local exchange carrier and a competitive local exchange carrier and the boundary represents where a call between a calling party and the called party is handed off between a handoff of the local exchange carrier and the competitive local exchange carrier, receiving the ping message at the dongle device, and processing the ping message at the dongle device, sending a feedback to the switch from the dongle device in response to the ping message, and evaluating the feedback at the switch to determine whether communications between a first component operated by a first one of the two different network service providers and a second component operated by a second one of the two different network service providers are in sync using the ping message.

12. A communication apparatus comprising a dongle device located in a device that represents a boundary between two different communication networks operated by two different network service providers, wherein the two different network service providers comprise a local exchange carrier and a competitive local exchange carrier and the boundary represents where a call between a calling party and the called party is handed off between a handoff of the local exchange carrier and the competitive local exchange carrier and secured between a male and a female electronic component, and wherein the dongle device has a means to monitor communication between the two different communications networks operated by the two different network service providers to determine whether communications between a first component operated by a first one of the two different network service providers and a second component operated by a second one of the two different network service providers are in sync using the ping message.

13. A communication apparatus comprising a dongle device configured to connect to a Krone block located at a boundary between two different communication networks operated by two different network service providers, wherein the two different network service providers comprise a local exchange carrier and a competitive local exchange carrier and the boundary represents where a call between a calling party and the called party is handed off between a handoff of the local exchange carrier and the competitive local exchange carrier and having a means to verify that communications between a first component operated by a first one of the two different network service providers and a second component operated by a second one of the two different network service providers are in sync using a ping message.

* * * * *